(12) United States Patent
Yamakawa

(10) Patent No.: US 8,972,358 B2
(45) Date of Patent: Mar. 3, 2015

(54) FILE STORAGE APPARATUS, FILE STORAGE METHOD, AND PROGRAM

(75) Inventor: Satoshi Yamakawa, Tokyo (JP)

(73) Assignee: NEC Corporation, Tokyo (JP)

( * ) Notice: Subject to any disclaimer, the term of this patent is extended or adjusted under 35 U.S.C. 154(b) by 130 days.

(21) Appl. No.: 13/702,893

(22) PCT Filed: Jun. 9, 2011

(86) PCT No.: PCT/JP2011/063201
§ 371 (c)(1),
(2), (4) Date: Dec. 7, 2012

(87) PCT Pub. No.: WO2011/155551
PCT Pub. Date: Dec. 15, 2011

(65) Prior Publication Data
US 2013/0080403 A1    Mar. 28, 2013

(30) Foreign Application Priority Data
Jun. 10, 2010  (JP) ................. 2010-132719

(51) Int. Cl.
*G06F 17/30* (2006.01)
*G06F 3/06* (2006.01)

(52) U.S. Cl.
CPC ........ *G06F 17/30179* (2013.01); *G06F 3/0608* (2013.01); *G06F 3/0641* (2013.01); *G06F 3/0661* (2013.01); *G06F 3/067* (2013.01)
USPC .... 707/690; 707/758; 707/812; 707/E17.014; 711/158; 711/173; 711/E12.001; 382/218

(58) Field of Classification Search
CPC .............. G06F 17/30156; G06F 17/30; G06F 17/30179; G06F 17/30007; G06F 17/30489; G06F 17/30067; G06F 17/30286; G06F 17/30008; G06F 12/0246; G06F 3/0641; G06F 3/061; G06F 3/0682; G06F 3/0605; G06F 3/067; G06F 3/0608; G06F 3/0661

USPC .......... 707/690, 692, 654, 679, 812, E17.005, 707/E17.007, 758, E17.014; 711/156, 103, 711/108, 159, 173, 162, 165, 102, E12.001; 382/218

See application file for complete search history.

(56) References Cited

U.S. PATENT DOCUMENTS 5,664,189 A * 9/1997 Wilcox et al. ................. 707/690
5,829,044 A * 10/1998 Sono ............................ 711/156

(Continued)

FOREIGN PATENT DOCUMENTS

JP    2000057159 A    2/2000
JP    2004502209 A    1/2004

(Continued)

OTHER PUBLICATIONS

Paul Darbyshire, and Adam Darbyshire—"Google Sites"—Getting StartED with Google Apps—2010, pp. 427-488.*

(Continued)

*Primary Examiner* — Anh Ly
(74) *Attorney, Agent, or Firm* — Sughrue Mion, PLLC

(57) ABSTRACT

A file storage apparatus comprises: duplication determination unit that determines whether file supplied from client apparatus and file stored in storage unit coincide with each other in same format, and stores the file supplied from client apparatus in the storage unit if the files do not coincide in the same format; and storage management unit that associates, if duplication determination unit determines that the files coincide in the same format, format of the file supplied from the client apparatus with the file stored in the storage unit, reads file stored in the storage unit in response to file read request from client apparatus, converts, if format associated with the read file exists, the read file into the format, and provides the converted file.

11 Claims, 8 Drawing Sheets

(56) References Cited

U.S. PATENT DOCUMENTS

| | | | |
|---|---|---|---|
| 6,785,429 B1* | 8/2004 | Senoh | 382/305 |
| 7,320,060 B2* | 1/2008 | Nakanishi et al. | 711/162 |
| 7,508,547 B2* | 3/2009 | Nishikawa et al. | 358/2.1 |
| 7,683,942 B2* | 3/2010 | Tsujii et al. | 711/162 |
| 7,900,000 B2* | 3/2011 | Nakamura et al. | 711/156 |
| 7,932,933 B2* | 4/2011 | Tsujii et al. | 711/162 |
| 8,838,555 B2* | 9/2014 | Von Kaenel et al. | 707/694 |
| 2003/0041306 A1 | 2/2003 | Takahashi | |
| 2004/0172512 A1* | 9/2004 | Nakanishi et al. | 711/162 |
| 2005/0018915 A1* | 1/2005 | Sumioka et al. | 382/234 |
| 2005/0280857 A1* | 12/2005 | Sugiyama et al. | 358/1.13 |
| 2006/0069892 A1* | 3/2006 | Nakanishi et al. | 711/162 |
| 2007/0122063 A1 | 5/2007 | Baba et al. | |
| 2007/0146365 A1* | 6/2007 | Kondo et al. | 345/426 |
| 2007/0180265 A1* | 8/2007 | Hiroshi | 713/187 |
| 2007/0204115 A1* | 8/2007 | Abramson | 711/154 |
| 2008/0063380 A1* | 3/2008 | Sasakura et al. | 386/124 |
| 2008/0154928 A1* | 6/2008 | Bashyam et al. | 707/101 |
| 2008/0244199 A1* | 10/2008 | Nakamura et al. | 711/156 |
| 2009/0051808 A1* | 2/2009 | Sumioka et al. | 348/420.1 |
| 2009/0083317 A1* | 3/2009 | Yoshihara | 707/103 R |
| 2009/0324064 A1* | 12/2009 | Nakamura et al. | 382/164 |
| 2010/0054613 A1* | 3/2010 | Henry | 382/233 |
| 2010/0145952 A1* | 6/2010 | Yoon et al. | 707/747 |
| 2010/0215277 A1* | 8/2010 | Huntington et al. | 382/218 |
| 2010/0225945 A1* | 9/2010 | Hatano | 358/1.13 |
| 2011/0016091 A1* | 1/2011 | Prahlad et al. | 707/654 |
| 2011/0122255 A1* | 5/2011 | Haritaoglu | 348/180 |
| 2011/0153692 A1* | 6/2011 | Nakamura et al. | 707/821 |
| 2011/0246431 A1* | 10/2011 | Iitsuka | 707/692 |
| 2012/0191928 A1* | 7/2012 | Nakamura et al. | 711/156 |
| 2013/0159598 A1* | 6/2013 | Huntington et al. | 711/102 |
| 2013/0297353 A1* | 11/2013 | Strange et al. | 705/4 |
| 2013/0326338 A1* | 12/2013 | Secord et al. | 715/243 |

FOREIGN PATENT DOCUMENTS

| | | |
|---|---|---|
| JP | 2005157768 A | 6/2005 |
| JP | 2006027265 A | 2/2006 |
| JP | 2007149018 A | 6/2007 |
| JP | 2007201861 A | 8/2007 |
| JP | 2009026075 A | 2/2009 |
| WO | 0163446 A2 | 8/2001 |

OTHER PUBLICATIONS

Paul Debevec, Erik Reinhard; Greg Ward; and Sumanta Pattanaik—"High dynamic range imaging"—Published in: Proceeding SIGGRAPH '04 ACM SIGGRAPH 2004 Course Notes—Article No. 14 Aug. 9, 2004—pp. 1-276.*

The international search report for PCT/JP2011/063201 mailed on Aug. 16, 2011.

* cited by examiner

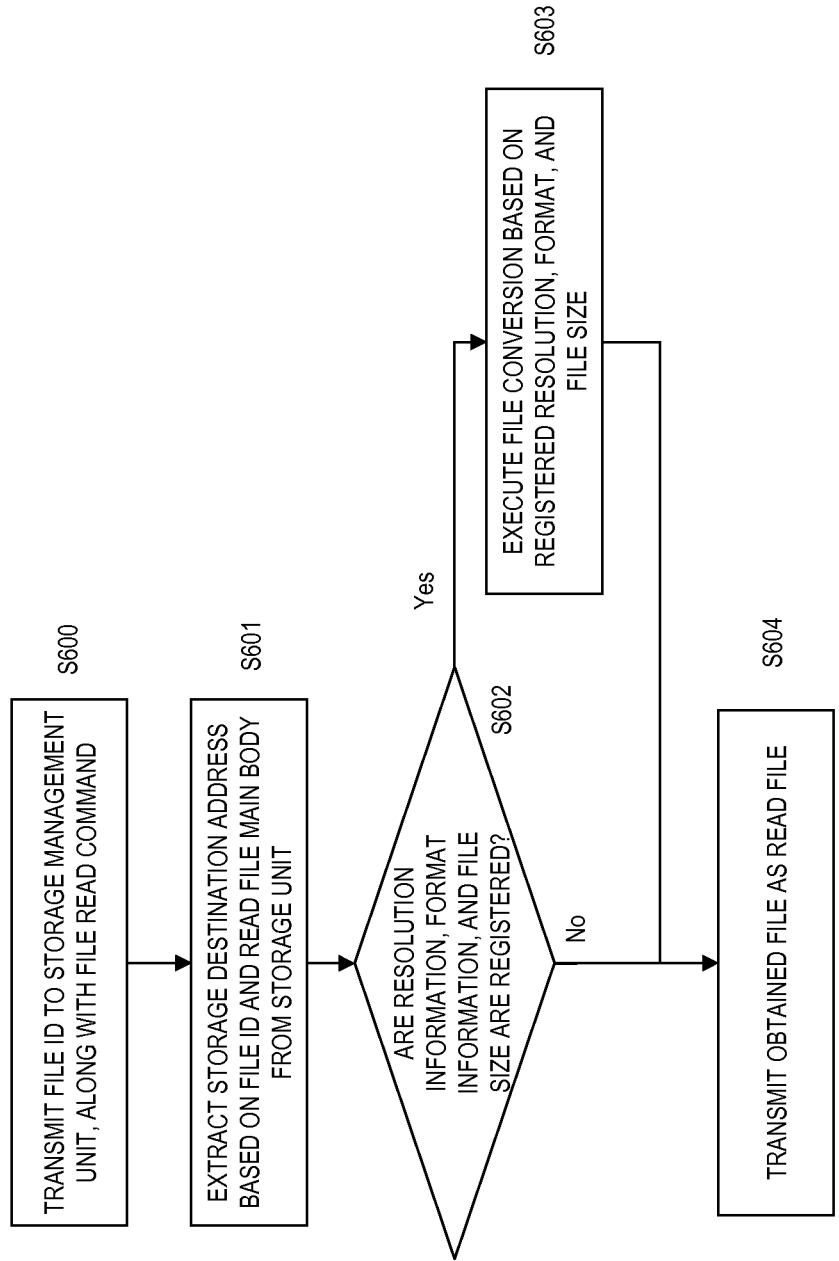

FILE STORAGE APPARATUS, FILE STORAGE METHOD, AND PROGRAM

This application is a National Stage Entry of PCT/JP2011/063201 filed Jun. 9, 2011, which claims priority from Japanese Patent Application 2010-132719 filed Jun. 10, 2010, the contents of all of which are incorporated herein by reference, in their entirety.

FIELD

REFERENCE TO RELATED APPLICATION

The present invention is based upon and claims the benefit of the priority of Japanese patent application No. 2010-132719, filed on Jun. 10, 2010, the disclosure of which is incorporated herein in its entirety by reference thereto.

The present invention relates to a file storage apparatus, a file storage method, and a program. In particular, it relates to a file storage apparatus, a file storage method, and a program for efficiently storing files.

BACKGROUND

<File Deduplication Storage Technique>
A method referred to as deduplication is known as a technique for storing a file in a storage medium while avoiding duplication of the file. Based on deduplication, when a file storage apparatus, which stores files created by a plurality of computing terminals in a centralized manner, stores a file in a physical storage medium such as a hard disk drive, the file storage apparatus determines whether the file overlaps with a previously stored file. If the file overlaps with a previously stored file, instead of storing the file in the storage medium, the file storage apparatus stores only pointer information with respect to the previously stored overlapping file. In this way, it is possible to reduce the physical storage capacity.

Usually, in deduplication, whether a file overlaps with a previously stored file is determined per file or per physical data block fixedly allocated when the file is stored in a storage medium on a file system. In this operation, small digest data of several dozen to several hundred bits generated by a hash function such as SHA1 (Secure Hash Algorithm 1) or MD5 (Message Digest 5) used in digital authentication and the like are compared with each other, to determine whether the files or data blocks are formed by the same byte string.

By using such duplication determination method with digest data, the process cost required for duplication determination executed on a file storage apparatus can be reduced. In particular, in a storage process in which a high-speed I/O process needs to be executed, by executing duplication determination simultaneously with an I/O process, a decrease in I/O process performance can be prevented.

Such deduplication-type storage system having digest data as a duplication determination means is used as a means for reducing the file storage cost of a file storage apparatus which is for storing backup files or a file storage apparatus which is for storing image files of system portions of a plurality of virtual OSs (Operating Systems), particularly in a computing environment where many files or data blocks formed by the same byte string exist.
<File Retrieval Technique based on Similarity of File Features>
An image retrieval method for extracting an image file similar to an input image file from among the image files belonging to an image file group is known. Based on this method, color information included in each of the image files in the image file group and shape information depicted in each image are formalized and stored as file feature information, and the feature information is compared with feature information of the input image file.

Based on this image retrieval method, the type or the number of items of the image file feature information used for comparison or an algorithm used for comparison is changed, depending on the level of similarity between the input image file and an extracted image file. In this way, the accuracy or speed in extracting a desired image file can be improved.

Such image retrieval technique has already been put to practical use as a system for retrieving an image file on the Internet similar to a reference image. For example, the image retrieval technique is in practical use as a WEB service handling Internet contents.

Thus, in the case of extracting a file in a format other than that of an image file such as a text file or a moving image file, such system that extracts semantic information embedded in a file as feature information and extracts a similar file based on the feature information can be established in a similar approach, while the information extracted as the feature information and the comparison method differ depending on the file formats processed.

Patent Literature 1 discloses a file system that realizes a file backup operation in which the same files are efficiently accumulated during file processing and that allows users to use the processed files easily when necessary.

In addition, Patent Literature 2 discloses an electronic file storage method. According to this method, when the same electronic files are stored, the files are stored as a single electronic file, thereby saving the memory capacity. In addition, the files appear to be stored in a directory structure specified by each user.

In addition, Patent Literature 3 discloses a graphic retrieval device that can realize higher accuracy and efficiency in graphic retrieval processing by automatically setting the type of an optimum shape feature quantity that should be used when retrieving a query graphic image.
[PTL 1]
Japanese Patent Kokai Publication No. JP2000-057159A
[PTL 2]
Japanese Patent Kokai Publication No. JP2005-157768A
[PTL 3]
Japanese Patent Kokai Publication No. JP2007-149018A

SUMMARY

The entire disclosures of Patent Literatures 1 to 3 are incorporated herein by reference thereto. The following analyses are given by the present inventor.

When multimedia files such as image files and video files are stored in a storage apparatus, these files are encoded into various file formats, to reduce the capacities of the files, to maintain the original qualities of the files, or depending on the purposes of the files.

These files are decoded when used by end-users. Some of these decoded files may be determined as being identical or visually substantially identical to other files. Some of the decoded files may be determined to have a derivative relationship with other files. For example, when a decoded file has such derivative relationship with another file, the decoded file has a resolution or a file compression rate changed from that of another file.

However, when storing a file while detecting file duplication and avoiding duplication based on identity or similarity of the file, it is difficult to use conventional techniques. This is because, when a file is stored in a storage apparatus, since a file is encoded into an arbitrary one of various formats, even if the technique based on comparison of digest values obtained by a conventional hash function is used, the file cannot be detected as a duplicate file.

Thus, when an encoded file, which is determined as being identical to another file when decoded, is stored in a storage apparatus, there is a need in the art to prevent redundant storage of the encoded file.

According to a first aspect of the present invention, there is provided a file storage apparatus, comprising:

a duplication determination unit that determines whether or not a file supplied from a client apparatus and a file stored in a storage unit coincide with each other in a same format, and stores the file supplied from the client apparatus in the storage unit if the files do not coincide with each other in the same format; and a storage management unit that associates, if the duplication determination unit determines that the files coincide with each other in the same format, a format of the file supplied from the client apparatus with the file stored in the storage unit, reads a file stored in the storage unit in response to a file read request from a client apparatus, converts, if a format associated with the read file exists, the read file into the format, and provides the converted file.

According to a second aspect of the present invention, there is provided a file storage method, comprising:

determining whether or not a file supplied from a client apparatus and a file stored in a storage unit coincide with each other in a same format;

storing the file supplied from the client apparatus in the storage unit if the files do not coincide with each other in the same format;

associating, if it is determined that the files coincide with each other in the same format, a format of the file supplied from the client apparatus with the file stored in the storage unit; and reading a file stored in the storage unit in response to a file read request from a client apparatus, converting, if a format associated with the read file exists, the read file into the format, and providing the converted file.

According to a third aspect of the present invention, there is provided a program, causing a computer to execute:

determining whether or not a file supplied from a client apparatus and a file stored in a storage unit coincide with each other in a same format;

storing the file supplied from the client apparatus in the storage unit if the files do not coincide with each other in the same format;

associating, if it is determined that the files coincide with each other in the same format, a format of the file supplied from the client apparatus with the file stored in the storage unit; and reading a file stored in the storage unit in response to a file read request from a client apparatus, converting, if a format associated with the read file exists, the read file into the format, and providing the converted file.

According to a fourth aspect of the present invention, there is provided a storage system, comprising: the above file storage apparatus; and a plurality of client apparatuses sharing the file storage apparatus.

The present invention provides the following advantage, but not restricted thereto. With the file storage apparatus, the file storage method, and the program according to the present invention, when an encoded file, which is determined as being identical to another file when decoded, is stored in a storage apparatus, redundant storage of the encoded file can be prevented.

BRIEF DESCRIPTION OF DRAWINGS

FIG. 8 is a flow chart illustrating a file read process according to the second exemplary embodiment.

PREFERRED MODES

Figure 1:
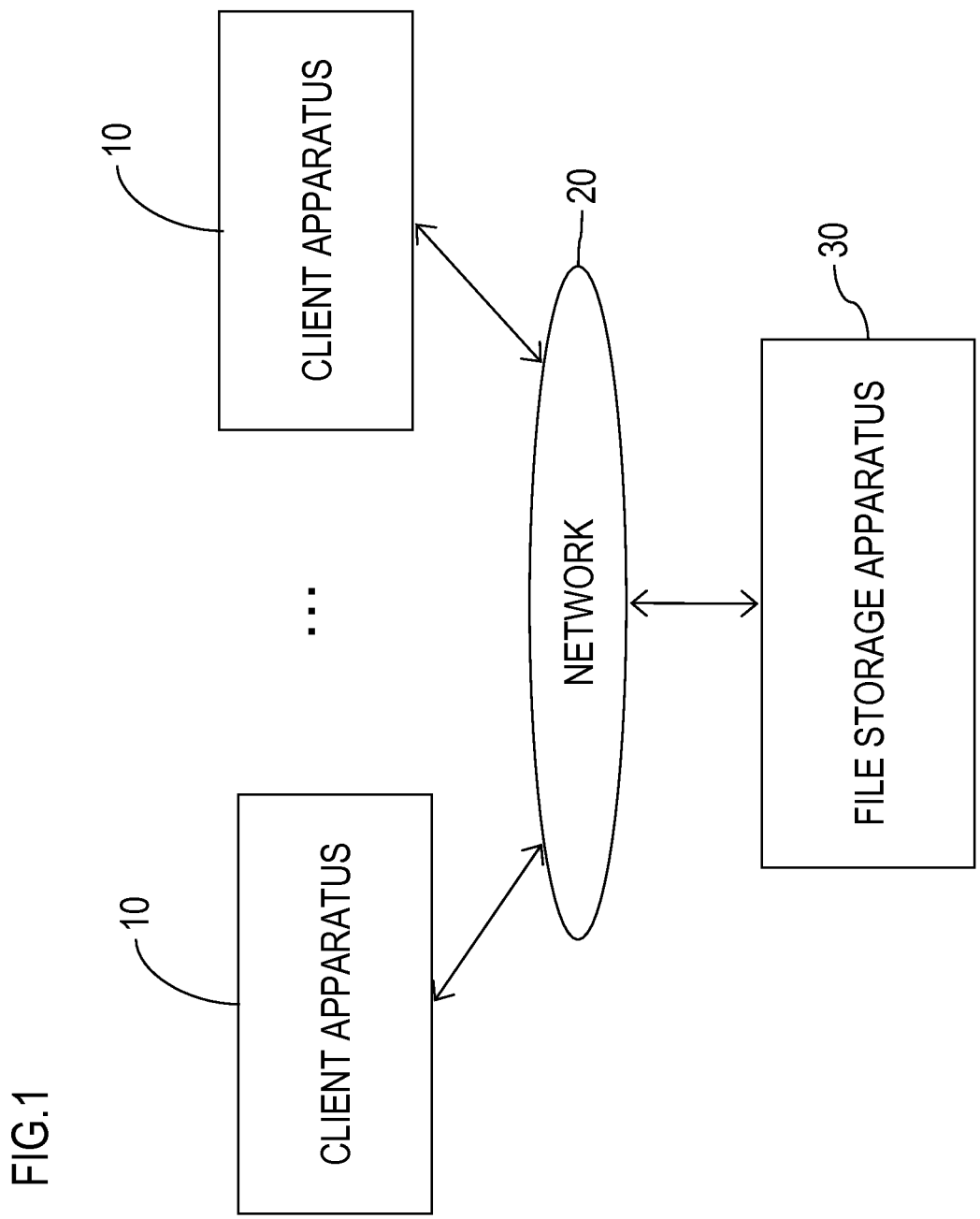
FIG. 1 is a block diagram illustrating a configuration of a storage system including a file storage apparatus according to first and second exemplary embodiments.

In the present disclosure, there are various possible modes, which includes the following, but not restricted thereto.

A file storage apparatus according to a first extended mode may be the file storage apparatus according to the above first aspect.

In a file storage apparatus according to a second extended mode, if similarity between feature information extracted from the file supplied from the client apparatus and feature information extracted from the file stored in the storage unit is not less than a predetermined threshold, the duplication determination unit may determine that the files coincide with each other.

In a file storage apparatus according to a third extended mode, if the file supplied from the client apparatus is an image file, the duplication determination unit may extract color information and/or shape information about an image as the feature information.

In a file storage apparatus according to a fourth extended mode, the duplication determination unit may determine whether a file supplied from the client apparatus and a file stored in the storage unit coincide with each other in a same resolution, and store the file supplied from the client apparatus in the storage unit if the files do not coincide with each other in the same resolution, and if the duplication determination unit determines that the files coincide with each other in the same resolution, the storage management unit may associate a resolution of the file supplied from the client apparatus with the file stored in the storage unit, read a file stored in the storage unit in response to a file read request from a client apparatus, convert, if a resolution associated with the read file exists, the read file into the resolution, and provide the converted file.

In a file storage apparatus according to a fifth extended mode, the duplication determination unit may determine whether a file supplied from the client apparatus and a file stored in the storage unit coincide with each other in a same compression rate, and store the file supplied from the client apparatus in the storage unit if the files do not coincide with each other in the same compression rate, the storage management unit may associate, if the duplication determination unit determines that the files coincide with each other in the same compression rate, a file size of the file supplied from the client apparatus with the file stored in the storage unit, read a file stored in the storage unit in response to a file read request from a client apparatus, convert, if a file size associated with the read file exists, the read file into the file size, and provide the converted file.

A file storage apparatus according to a sixth extended mode may further comprise the above storage unit.

A file storage apparatus according to a seventh extended mode may be shared by a plurality of client apparatuses.

A file storage method according to an eighth extended mode may be the file storage method according to the above second aspect.

A program according to a ninth extended mode may be the program according to the above third aspect.

With the file storage apparatus, the file storage method, and the program according to the present invention, if a file is determined as being identical or visually substantially identical to another file after decoded or if a file is determined to have a changed resolution or file compression rate from that of another file and to have a derivative relationship with the another file after decoded, this file is determined as a duplicate file. In such case, the files are integrated and stored as a single file in the file storage apparatus. Thus, the file storage capacity and storage cost can be reduced.

Namely, with the file storage apparatus, the file storage method, and the program according to the present invention, whether a file supplied from the client apparatus and a file stored in the storage unit coincide with other in a same format is determined. If the files do not coincide with each other, the file supplied from the client apparatus is stored in the storage unit. Thus, when an encoded file, which is determined as being identical or similar to another file when decoded, is stored in the storage apparatus, redundant storage of the encoded file can be prevented. As a result, the file storage capacity can be reduced.

In addition, with the file storage apparatus, the file storage method, and the program according to the present invention, since the format of the file supplied from the client apparatus is associated with the file stored in the storage unit, the file can be converted into a format different from that stored in the storage unit and the converted file can be provided to the client apparatus.

(First Exemplary Embodiment)

A file storage apparatus according to an exemplary embodiment will be described with reference to the drawings. FIG. 1 is a block diagram illustrating a configuration of a storage system including a file storage apparatus 30 according to the present exemplary embodiment.

In FIG. 1, the storage system includes at least one client apparatus 10 and the file storage apparatus 30. These apparatuses are connected to each other via a network 20.

The client apparatuses 10 output a request for creating a new file and a request for deleting a file to the file storage apparatus 30. In addition, the client apparatuses 10 output a request for reading a stored file and a request for writing a file to the file storage apparatus 30.

In response to the above request transferred from a client apparatus 10 via the network 20, the file storage apparatus 30 executes a process of creating a new file, deleting a file, reading a file stored in the file storage apparatus, or writing a file in the file storage apparatus. In addition, the file storage apparatus 30 transfers a processing result to the client apparatus 10, from which the process request is transmitted, via the network 20.

Figure 2:
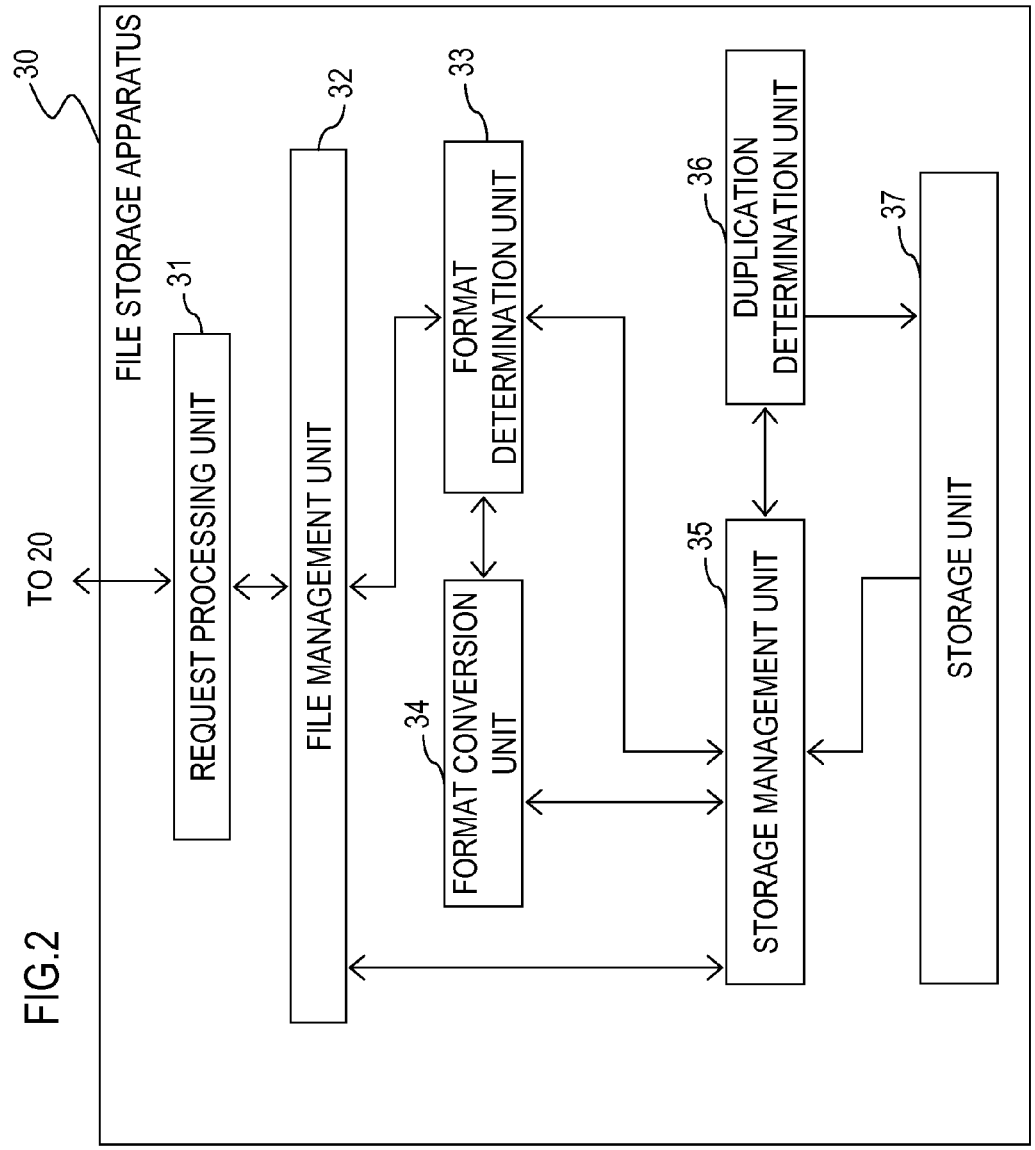
FIG. 2 is a block diagram illustrating a configuration of the file storage apparatus according to the first and second exemplary embodiments.

FIG. 2 is a block diagram illustrating a configuration of the file storage apparatus 30. In FIG. 2, the file storage apparatus 30 includes a request processing unit 31, a file management unit 32, a format determination unit 33, a format conversion unit 34, a storage management unit 35, a duplication determination unit 36, and a storage unit 37.

The request processing unit 31 receives various file process requests from the client apparatuses 10 via the network 20, such as requests for creating a new file, deleting, reading, and updating a file. In response to such a file process request, the request processing unit 31 transfers a process request file and a file to the file management unit 32. In addition, when notified of completion of a process by the file management unit 32, the request processing unit 31 transfers a completed process result to a corresponding client apparatus 10 via the network 20.

The file management unit 32 serves as a file system in the file storage apparatus 30. In addition, the file management unit 32 generates file ID information that uniquely indicates a file, manages various metadata allocated to a file, and manages a directory tree structure. In addition, based on these metadata, the file management unit 32 determines whether each of the process requests transmitted from the client apparatuses 10 is executable and determines whether these process requests have been executed.

The format determination unit 33 determines whether an extension allocated to a file or file format information embedded in a file matches file format information included in a file format list registered in advance in the format determination unit 33.

The format conversion unit 34 receives a file main body and specified after-conversion format information from another unit, converts a format of the supplied file main body based on the specified format information, and transmits the converted file to the unit from which the file is supplied.

The storage management unit 35 stores files managed by the file management unit 32 in the storage unit 37. In addition, the storage management unit 35 manages information about storage destination addresses of the files stored in the storage unit 37. In addition, in response to a request from the file management unit 32, the storage management unit 35 executes a process of reading a file from the storage unit 37 or a process of writing a file in the storage unit 37 via the duplication determination unit 36.

The duplication determination unit 36 determines whether a new file to be stored in the storage unit 37 is a duplicate of any one of the files previously stored in the storage unit 37. In addition, the duplication determination unit 36 executes a process of storing a file in the storage unit 37 and deleting a file from the storage unit 37.

The storage unit 37 includes a storage medium such as a hard disk drive. In response to a request from the storage management unit 35 and the duplication determination unit 36, the storage unit 37 writes a file in the storage medium. In addition, in response to a request, the storage unit 37 deletes or reads a file from the storage medium.

In the present exemplary embodiment, if a decoded file is identical to another file, even if the files have different encoding formats, the file is deemed as a duplicate file. Storage of such file will be described.

Herein, the decoded file being identical to another file refers to a file that is encoded in a certain format so that no file loss is caused. For example, in the case of an image file, examples of the decoded file being identical to another file include a file in bitmap format, a file in JPEG (Joint Photographic Experts Group) and JPEG2000 lossless-encoding format, and a file in PNG (Portable Network Graphic) format.

<Procedure of Registering File From Storage Management Unit 35 to Duplication Determination Unit 36>

Figure 3:
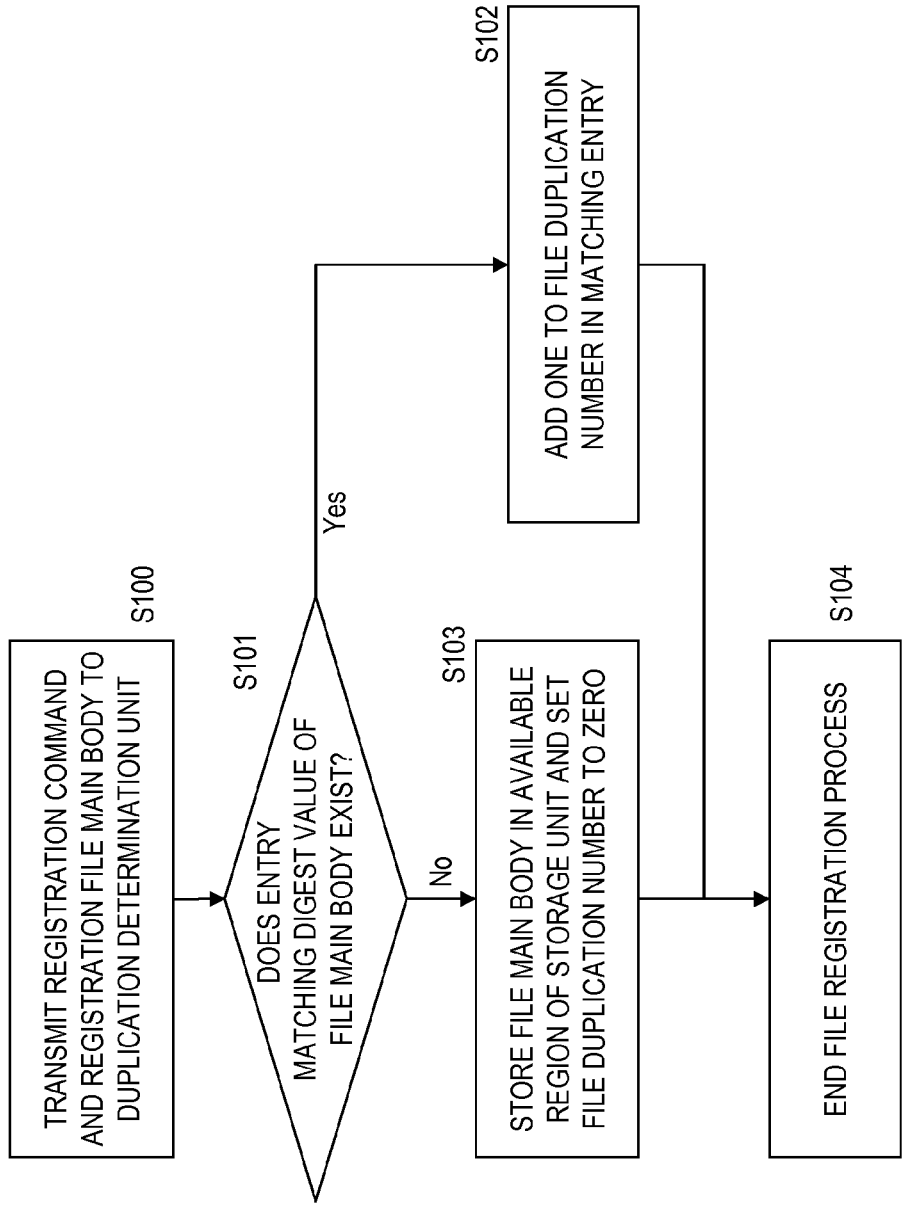
FIG. 3 is a flow chart illustrating a file registration process according to the first exemplary embodiment.

FIG. 3 is a flow chart illustrating a file registration process according to the present exemplary embodiment. A file is registered when the storage management unit 35 issues a file registration process command to the duplication determination unit 36, along with a registration file.

In the present exemplary embodiment, the duplication determination unit 36 has a function of using a hash function and calculating a digest value from a registration target file transmitted from the storage management unit 35. In addition, the duplication determination unit 36 includes a hash table storing calculated digest values and storage destination addresses of registration target files in the storage unit 37.

The storage management unit 35 transmits a file registration process command to the duplication determination unit 36, along with a registration file main body (step S100).

The duplication determination unit 36 uses a predetermined hash function to calculate a digest value from the file transmitted from the storage management unit 35 and determines whether the hash table includes an entry having a digest value matching the calculated digest value (step S101).

If an entry matching the calculated digest value exists (Yes in step S101), the duplication determination unit 36 acquires file storage destination address information stored in the entry in the hash table and adds one to the file duplication number (step S102). In addition, the duplication determination unit 36 notifies the storage management unit 35 of the storage destination address information.

If different files have the same digest value, error duplication detection could be caused. To avoid this, the following methods may be used. Namely, if a matching digest value exists, based on file storage destination address information associated with the digest value, a file stored in the storage unit 37 may be read, and whether the byte string of the new file to be registered is aligned may be checked.

If no entry matching the calculated digest value exists (No in step S101), the duplication determination unit 36 stores the new file to be registered in an available file storage region of the storage unit 37. In addition, the duplication determination unit 36 registers the calculated digest value, the information about the storage destination address of the file in the storage unit 37, and a file in which the file duplication number is set to zero in the hash table (step S103). In addition, the duplication determination unit 36 notifies the storage management unit 35 of the storage destination address information.

Thus, the file registration process is ended (step S104).

<Procedure of Deleting File From Storage Management Unit 35 to Duplication Determination Unit 36>

A file is deleted when the storage management unit 35 issues a file deletion process command, which is transferred along with storage destination address information of a file to be deleted, to the duplication determination unit 36.

The duplication determination unit 36 retrieves storage destination address information registered in the hash table, based on the file address information transferred from the storage management unit 35, to extract a corresponding entry.

In addition, the duplication determination unit 36 checks the file duplication number associated with the extracted entry. If the file duplication number is zero, the corresponding file stored in the storage unit 37 is deleted, based on the storage destination address information.

However, if the file duplication number is not less than one, the duplication determination unit 36 subtracts one from the file duplication number.

In addition, the duplication determination unit 36 notifies the storage management unit 35 of completion of the file deletion process.

Thus, the file deletion process is ended.

Next, procedures of a process of creating a new file and of deleting, reading, and writing a file executed by the file storage apparatus 30 will be described.

For example, a file access request process, such as a request for creating a new file and deleting, reading, or writing a file, transmitted from a client apparatus 10 to the file storage apparatus 30 is executed by using a network file system protocol such as NFS (Network File System) or CIFS (Common Internet File System).

The request processing unit 31 interprets various network file system protocols and transfers various file access processes to the file management unit 32. When a file access process is completed by the file management unit 32, the request processing unit 31 converts process completion notification into various network file system protocols and transfers the result to the client apparatus 10.

<Procedure of Creating New File>

A procedure of creating a new file by the file storage apparatus 30 will be described with reference to the drawings.

When the file management unit 32 receives a directory name of a file creation destination, a file name, and other file metadata information, which are transmitted along with a new file creation command transferred from the request processing unit 31, if there is no problem with permission for creating a file such as permission for writing a file, the file management unit 32 generates file ID information uniquely determining a file, associates metadata that is generated based on specified various metadata information and that is managed on the file system with the generated ID information, and stores the data.

After completion of the above storage process, the file management unit 32 transfers the file ID information to the request processing unit 31, along with notification of completion of the new file creation process. Thus, the process is completed. In the processes of deleting, reading, and writing a file, a process target is specified by using the file ID information.

<Procedure of Writing File>

Figure 4:
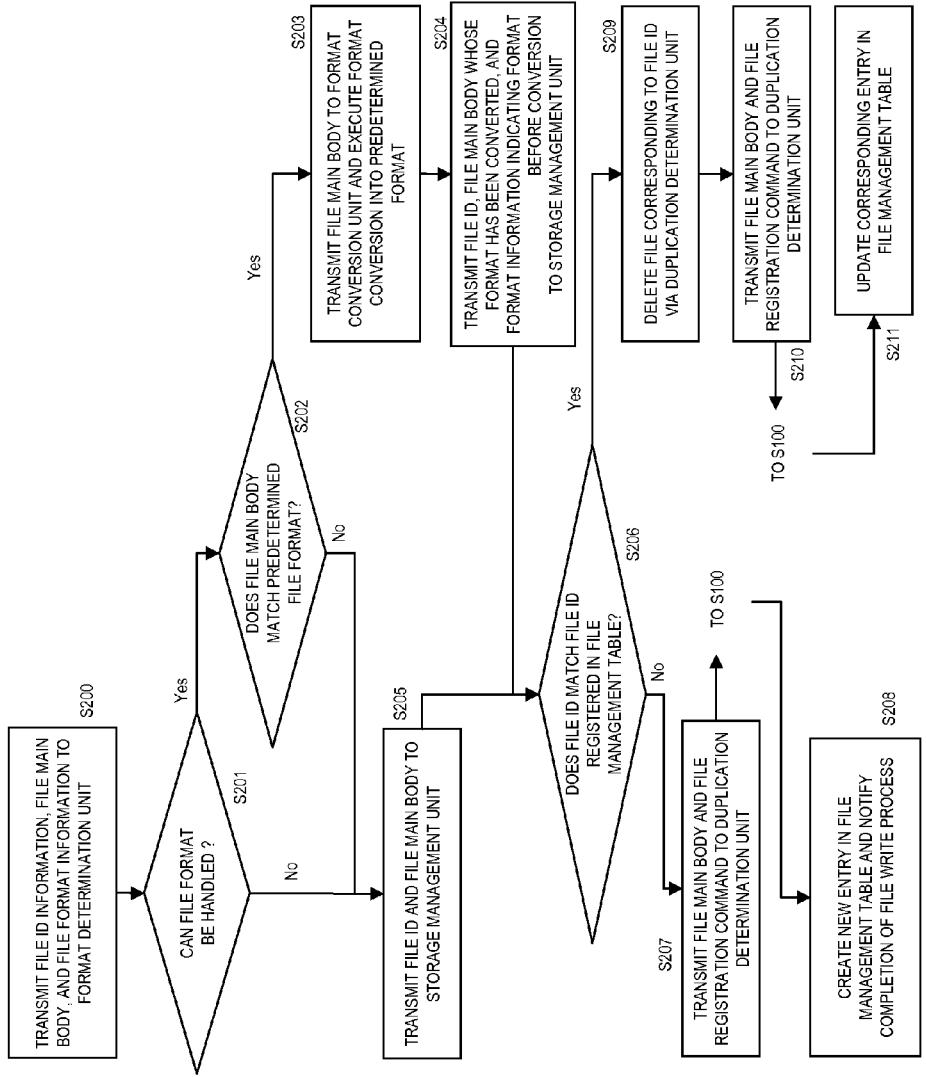
FIG. 4 is a flow chart illustrating a file write process according to the first exemplary embodiment.

FIG. 4 is a flow chart illustrating a file write process. A file write procedure by the file storage apparatus 30 will be described with reference to FIG. 4.

Based on the file ID information and a file main body transmitted, which are transmitted along with a file write command transferred from the request processing unit 31, the file management unit 32 stores a file ID and a flag indicating that the file write process has not been completed. In addition, the file management unit 32 transmits the file ID information, the file write command, the file main body, and an extension (namely, file format information) given to the file name of the file to the format determination unit 33 (step S200).

The format determination unit 33 extracts the extension information and format information embedded in the file main body and determines whether the file main body is in a file format registered in the format determination unit 33 (step S201).

For example, if an image file is to be written, the format determination unit 33 determines whether the image file is in a lossless format such as a bitmap format, JPEG or JPEG 2000 lossless format, or PNG format.

If the format matches a registered file format (Yes in step S201), the format determination unit 33 checks whether the file main body matches one of the above predetermined file formats (step S202).

If the file main body matches (Yes in step S202), the format determination unit 33 specifies the single predetermined file format information as a format into which the file is to be converted and transmits the file main body to the format conversion unit 34 (step S203).

For example, if the target file is an image file, a lossless format is determined in advance as the predetermined single file format information and the file format into which the file is to be converted.

However, if the file main body does not match any one of the above predetermined file formats (No in step S202), the file format conversion unit 33 does not transmit the file main body to the format conversion unit 34.

Based on the specified conversion format information transmitted from the format determination unit 33, the format conversion unit 34 converts the file main body into the specified conversion format and transmits the converted file main body to the format determination unit 33 (step S203).

If the format conversion unit 34 executes format conversion (in step S203 after Yes in step S202), the format determination unit 33 transmits the file ID information, the file main body whose format has been converted, and the file format information indicating the format before the conversion to the storage management unit 35, along with the file write command (step S204).

If the file main body does not match a file format registered in the format determination unit 33 (No in step S201) or if no format conversion is executed by the format conversion unit 34 (No in step S202), the format determination unit 33 transmits the file ID information and the file main body to the storage management unit 35, along with the file write command (step S205).

To manage the files stored in the storage unit 37, the storage management unit 35 includes a file management table including file ID information and information about storage destination addresses in the storage unit 37. If format conversion is executed by the format conversion unit 34, the file management table also includes information about the format before the format conversion.

The storage management unit 35 checks whether the file management table includes a file ID matching the above file ID (step S206).

If no matching file ID exists (No in step S206), the storage management unit 35 transmits a file registration command to the duplication determination unit 36, along with the file main body transmitted from the format determination unit 33 (step S207).

After completion of the file registration process, the duplication determination unit 36 notifies the storage management unit 35 of information about the file destination address in the storage unit 37 (steps S100 to S104 in FIG. 3).

When receiving the above information about the file storage destination address, the storage management unit 35 creates an entry including the file ID information transmitted from the file format conversion unit 33 and the storage destination address information in the file management table. If format conversion is executed by the file format conversion unit 34, the storage management unit 35 includes the information about the format before the format conversion in the entry. In addition, the storage management unit notifies the format determination unit 33 of completion of the file write process, along with the file ID information (step S208).

If the file management table of the storage management unit 35 includes an entry matching the file ID information transmitted with the write command from the file format determination unit 33 (corresponding to a file update process) (Yes in step S206), the storage management unit 35 transmits a file deletion command to the duplication determination unit 36, along with the storage destination address information registered in the entry corresponding to the previously-registered file ID information.

After completion of the deletion process (step S209), the storage management unit 35 transmits a file registration command to the duplication determination unit 36, along with the file main body transmitted from the format determination unit 33 (step S210).

In addition, after completion of the file registration, the storage management unit 35 changes the entry corresponding to the file ID information in the file management table, based on the storage destination address information transmitted from the duplication determination unit 36. Only if format conversion is executed by the file format conversion unit 34 and there is a change of the information about the format before the format conversion, the format information is updated (step S211). In addition, the storage management unit 35 notifies the format determination unit 33 of completion of the file write process, along with the file ID information.

When notified of completion of the write process, the format determination unit 33 notifies the file management unit 32 of completion of the write process, along with the file ID information.

When notified of completion of the write process, the file management unit 32 sets the flag indicating completion of the write process regarding the file ID information to a write completion state and ends the write process.

<Procedure of Reading File>

Figure 5:
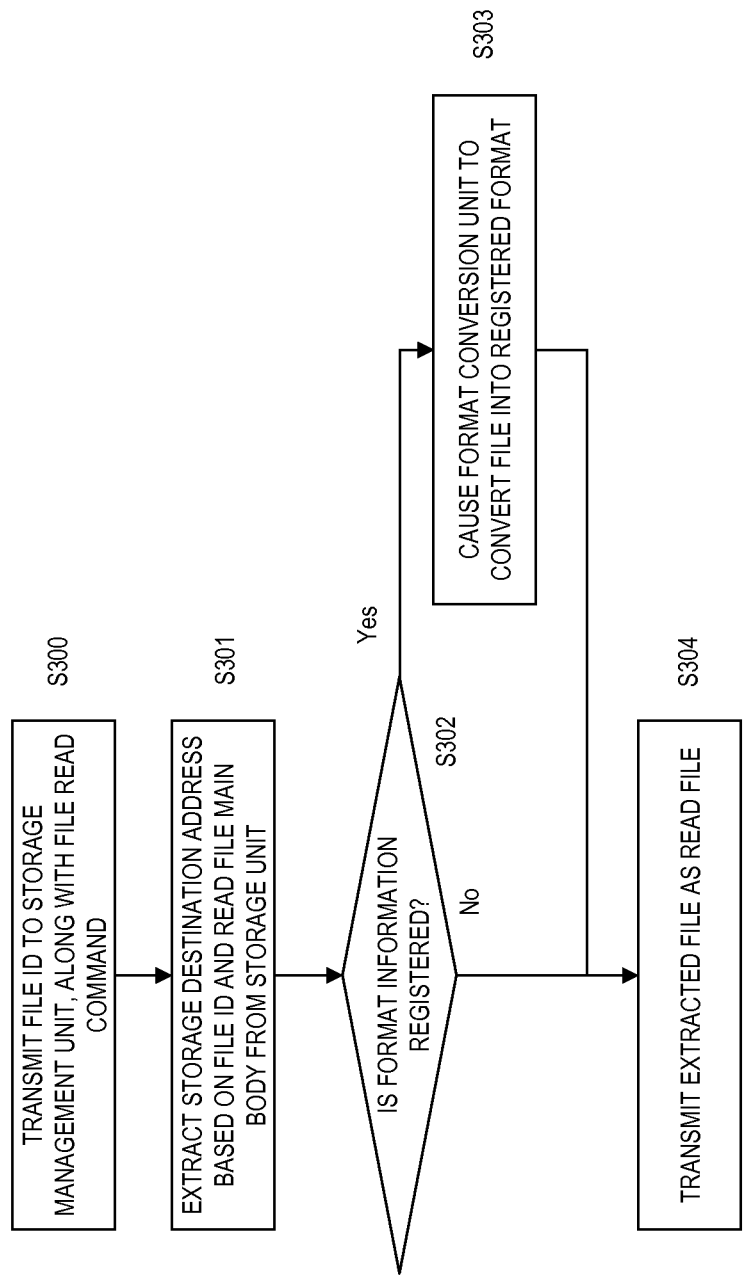
FIG. 5 is a flow chart illustrating a file read process according to the first exemplary embodiment.

Next, a file read procedure by the file storage apparatus 30 will be described. FIG. 5 is a flow chart illustrating a file read procedure according to the present exemplary embodiment.

In FIG. 5, the file management unit 32 transmits file ID information, which is transmitted along with a file read command transferred from the request processing unit 31, to the storage management unit 35 along with a file object read command (step S300).

When receiving the file read command, the storage management unit 35 retrieves an entry having file ID information matching the above file ID information from the entries registered in the file management table, extracts information about a storage destination address of a corresponding file in the storage unit 37, and reads the corresponding file main body from the storage unit 37 (step S301).

In addition, the storage management unit 35 checks whether information about a format before format conversion is registered in the entry having the above file ID information in the file management table (step S302).

If information about the format before conversion is registered (Yes in step S302), the storage management unit 35 transmits the file main body to the format conversion unit 34, specifying the information about the format before conversion.

The format conversion unit 34 converts the file main body into the specified format and transmits the converted file main body to the storage management unit 35 (step S303).

If format conversion is executed, the storage management unit 35 transmits the file main body whose format has been converted to the file management unit 32. If no format conversion is executed, the storage management unit 35 transmits the file main body read from the storage unit 37 to the file management unit 32 (step S304). In addition, the storage management unit 35 notifies the file management unit 32 of completion of the read process.

<Procedure of Deleting File>

Next, a file deletion procedure by the file storage apparatus 30 will be described.

The file management unit 32 transmits file ID information, which is transmitted along with a file deletion command transferred from the request processing unit 31, to the storage management unit 35, along with the file deletion command.

When receiving the file deletion command, the storage management unit 35 retrieves an entry having file ID information matching the above file ID information from the entries registered in the file management table and extracts information about a storage destination address in the storage unit 37. In addition, the storage management unit 35 transmits the file deletion command and the extracted storage destination address information to the duplication determination unit 36.

When receiving the deletion command, the duplication determination unit 36 executes a deletion process based on the storage destination address information. In addition, the duplication determination unit 36 notifies the storage management unit 35 of completion of the deletion process.

When notified of completion of the deletion by the duplication determination unit 36, the storage management unit 35 deletes the entry as the deletion process target from the file management table. In addition, the storage management unit 35 transmits notification of completion of the deletion process to the file management unit 32.

(Second Exemplary Embodiment)

As a second exemplary embodiment, a case where a decoded file has a derivative relationship with a file stored in advance in the file storage apparatus 30 will be described. For example, when a decoded file has such derivative relationship with such file, the decoded file has a resolution or a file compression rate changed from that of the file.

In the present exemplary embodiment, a file that has been encoded as an image file to be written in the file storage apparatus 30 and that, after the file is decoded, has a derivative relationship with a file stored in advance in the file storage apparatus is treated as a duplicate file. The file has a resolution or a file compression rate changed from that of the stored file.

The duplication determination unit 36 extracts information about a color used in an image file and information about an object shape expressed on the image file as feature information included in the image file. In addition, the duplication determination unit 36 stores these two types of feature information as indexes and compares these indexes with feature information about an input image file. In this way, the duplication determination unit 36 determines whether a file is a duplicate file.

<Extraction of Feature Information and Conversion of the Feature Information Into Indexes>

Extraction of image file feature information and conversion of the information into indexes by the duplication determination unit 36 will be executed as follows. When feature information is extracted from an image file to be stored in the file storage apparatus 30, the feature information is converted into indexes and the indexes are stored in the duplication determination unit 36 for duplication determination for subsequently-inputted image files.

From an inputted image file, the duplication determination unit 36 extracts color information of each of the pixels forming the image file. For example, the duplication determination unit 36 may extract color information, based on a color model such as RGB.

After extracting color information, the duplication determination unit 36 forms a histogram by degenerating the color information to a predetermined number of gradation levels and counting the pixels per gradation level after degeneration. In addition, the duplication determination unit 36 normalizes the image file based on the total pixel number thereof and expresses the image file as indexes, so that a file having a different resolution can be managed.

When expressing the pixel information as indexes, based on resolution of the image file in the vertical and horizontal directions, the duplication determination unit 36 may equally divide the image file by a predetermined number and express each divided image as an index.

The duplication determination unit 36 stores index data in an entry in a feature information management table, along with the storage destination address information of the file in the storage unit 37 and the file duplication number.

<Procedure of Registering File From Storage Management Unit 35 to Duplication Determination Unit 36>

Figure 6:
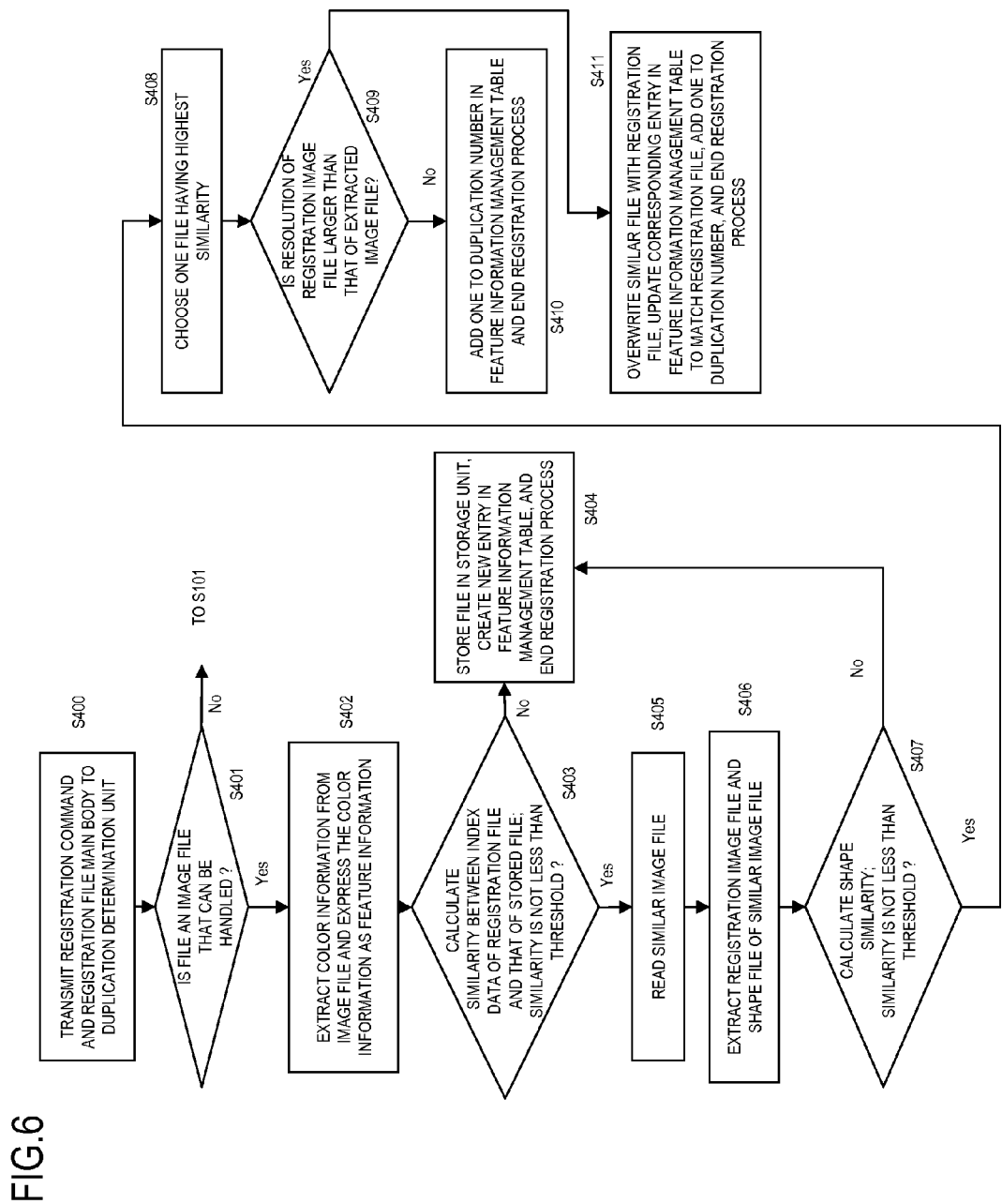
FIG. 6 is a flow chart illustrating a file registration process according to the second exemplary embodiment.

FIG. 6 is a flow chart illustrating a file registration process according to the present exemplary embodiment. A file is registered when the storage management unit 35 issues a registration file, a file registration process command, and flag information, which indicates whether the file is an image file that can be handled by the file storage apparatus 30, to the duplication determination unit 36.

In FIG. 6, the storage management unit 35 transmits a registration file, a file registration process command, and flag information, which indicates whether the file is an image file that can be handled by the file storage apparatus 30, to the duplication determination unit 36 (step S400).

The duplication determination unit 36 determines whether the file is an image file that can be handled by the file storage apparatus 30, based on the above flag information (step S401).

If the file is not an image file that can be handled by the file storage apparatus 30 (No in step S401), as in the first exemplary embodiment, the duplication determination unit 36 searches a hash table including storage destination addresses of the files in the storage unit 37 and digest values of the storage files for a duplicate file and registers the file (steps S101 to S104).

If the file is an image file that can be handled by the file storage apparatus 30 (Yes in step S401), after extracting file resolution information and file format information from the registration target file, the duplication determination unit 36 extracts feature information based on color information of the image file and expresses feature information of the image file as index data (step S402).

In addition, the duplication determination unit 36 compares the index data with the image file index data group that is registered in the feature information management table stored in the file storage apparatus 30 and extracts an entry having index data similar to that of the input file.

In the similarity determination, the duplication determination unit 36 compares index histograms. For example, the duplication determination unit 36 may calculate similarity between histograms, by using a histogram matching algorithm such as histogram intersection.

Alternatively, when extracting an entry having similar index data, the duplication determination unit 36 may extract an entry having similarity not less than a predetermined threshold. In this case, the duplication determination unit 36 checks whether the acquired similarity is not less than a threshold (step S403). If the acquired similarity is less than the threshold (No in step S403), the duplication determination unit 36 determines that no duplicate files exist.

If a plurality of entries have a value not less than the predetermined threshold (Yes in step S403), the duplication determination unit 36 sequentially extracts the plurality of entries, starting with the entry having the largest similarity value.

If the acquired similarity is less than the threshold (No in step S403), the duplication determination unit 36 determines that duplicate files do not exist and stores the registration target file in an available file storage region of the storage unit 37. In addition, the duplication determination unit 36 creates a new entry in the feature information management table, the new entry including resolution information, file format information, information about the storage destination address of the file in the storage unit 37, information about the file duplication number that is set to zero, and index data about color information (step S404). In addition, the duplication determination unit 37 notifies the storage management unit 35 of the storage destination address information, the resolution information, the file format information, and a file size. Thus, the file registration process is completed.

If the acquired similarity is not less than the threshold (Yes in step S403), the duplication determination unit 36 reads an image file of the corresponding entry from the storage unit 37, based on the information about the storage destination address in the storage unit 37 registered in the corresponding entry information (step S405).

Next, the duplication determination unit 36 extracts the registration target image file and object shape data expressed on the image file extracted from the storage unit 37 (step S406).

When extracting the object shape data, the duplication determination unit 36 calculates the aspect ratio of each file image. If the files have different aspect ratios, the extracted data is adjusted so that the aspect ratio thereof matches that of the registration target image file.

To extract the object shape data, a binary image is generated based on shading information about the image, and an object outline is extracted. Next, a tangent line is drawn per predetermined length from a certain point on the outline, and an angle with respect to a vertical-direction axis or a horizontal-direction axis is extracted along the outline. The object shape data is expressed as an index by counting a distribution of angle information about the outline.

The duplication determination unit 36 compares files expressed as indexes and determines whether the similarity is not less than a predetermined threshold (step S407).

If the similarity is not less than the predetermined threshold (Yes in step S407), the duplication determination unit 36 determines that the file is a duplicate file.

If a plurality of image files are extracted by comparison of the color information, the duplication determination unit 36 executes comparison on the shape data of each of the extracted image files. The duplication determination unit 36 determines an image file having similarity not less than the predetermined threshold (Yes in step S407) and having the highest similarity to be a duplicate file (step S408).

After comparison based on the shape data, if no image file determined to be a duplicate file exists (No in step S407), the duplication determination unit 36 determines that no duplicate files exist. In addition, the duplication determination unit 36 stores the registration image file in the storage unit 37 as described above and notifies the storage management unit 35 of completion of the process. Thus, the file registration process is completed (step S404).

If an image file extracted as a duplicate file exists by the comparison based on the shape data, the duplication determination unit 36 compares resolution of the registration target image file with that of the extracted image file (step S409). If the resolution of the registration target image file is not larger (No in step S409), after adding one to the file duplication number information in the feature information management table, the duplication determination unit 36 notifies the storage management unit 35 of the storage destination address information, the resolution information of the registration target image file, the file format information, and a file size. Thus, the file registration process is completed (step S410).

If the resolution of the registration target image file is larger (Yes in step S409), the duplication determination unit 36 overwrites the extracted image file stored in the storage unit 37 with the registration target image file, adds one to the file duplication number information in the feature information management table, and updates the index data based on the color information to the index data extracted from the registration target image file. In addition, the duplication determination unit 36 notifies the storage management unit of the storage destination address information, the resolution information, the file format information, and the file size. Thus, the file registration process is completed (step S411).

<Procedure of Deleting File From Storage Management Unit 35 to Duplication Determination Unit 36>

The file deletion procedure by the file storage apparatus 30 is the same as that according to the first exemplary embodiment. However, depending on the deletion target file, either the hash table or the feature information management table is updated or an entry is deleted.

Next, procedures of processes of creating a new file and deleting, reading, and writing a file executed by the file storage apparatus 30 will be described.

Among the file access request processes from a client apparatus 10 to the file storage apparatus 30, such as processes of creating a new file and deleting, reading, and writing a file, the processes executed by the request processing unit 31 and the file management unit 32 are the same as those according to the first exemplary embodiment.

<Procedure of Creating New File>

The procedure of creating a new file by the file storage apparatus 30 is also the same as that according to the first exemplary embodiment.

<Procedure of Writing File>

Figure 7:
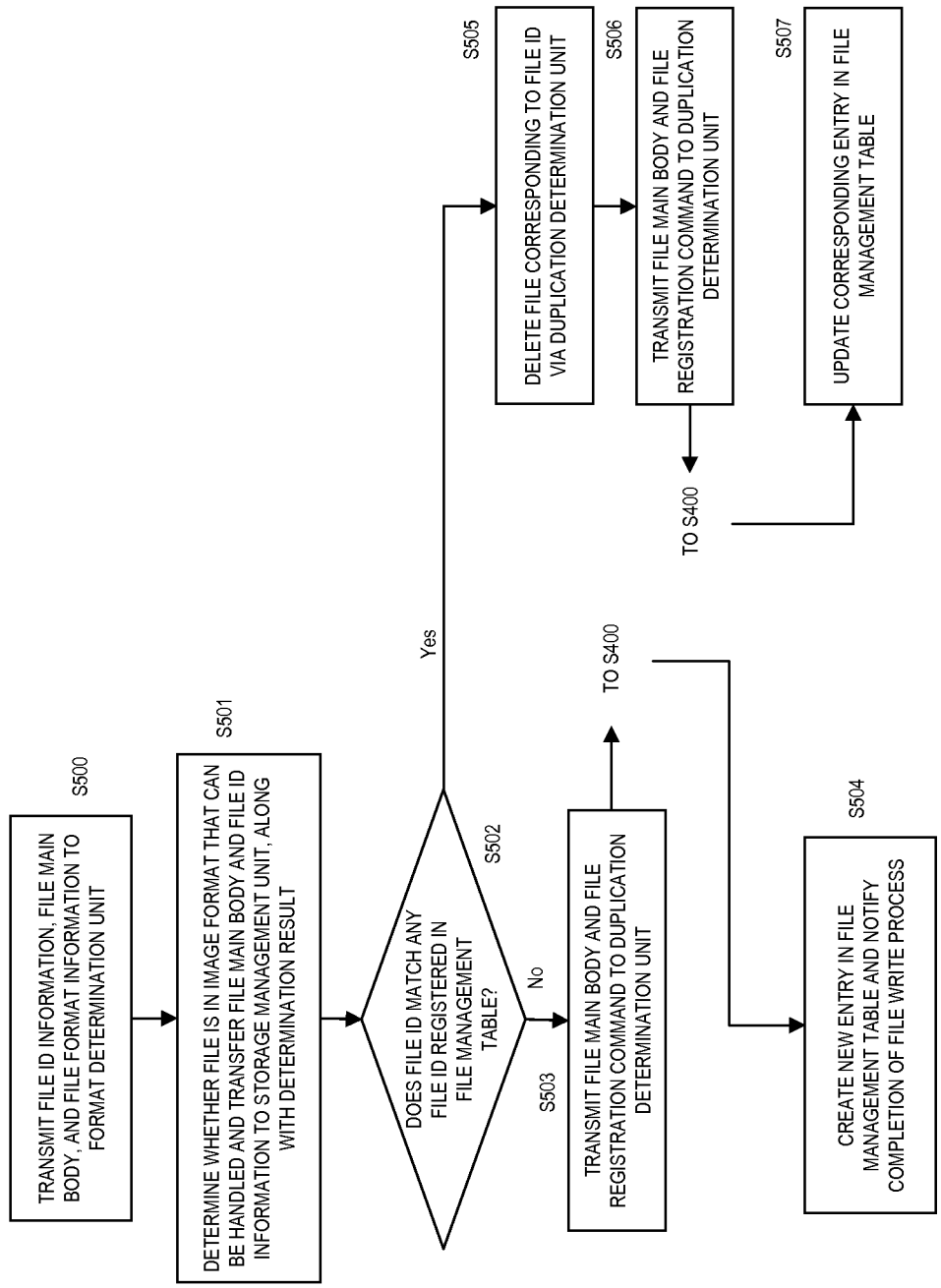
FIG. 7 is a flow chart illustrating a file write process according to the second exemplary embodiment.

FIG. 7 is a flow chart illustrating a file write process according to the present exemplary embodiment. A file write procedure by the file storage apparatus 30 will be described with reference to FIG. 7.

The file management unit 32 stores the file ID and a flag indicating that the file write process has not been completed, based on file ID information and a file main body transmitted along with a file write command transferred from the request processing unit 31. In addition, the file management unit 32 transmits the file ID information, the file write command, the file main body, and an extension (namely, file format information) given to the file name of the file to the format determination unit 33 (step S500).

The format determination unit 33 extracts the extension information and the format information embedded in the file main body, determines whether the file is in an image file format registered in the format determination unit 33, and transmits the file ID information, the file main body, and information indicating whether the file is an image file that can be handled by the file storage apparatus 30 to the storage management unit 35 (step S501).

To manage the files stored in the storage unit 37, the storage management unit 35 includes a file management table including file ID information, information about storage destination addresses in the storage unit 37, resolution information, file format information, and file size.

The storage management unit 35 checks whether a file ID matching the above file ID exists in the file management table (step S502).

If no matching file ID exists (No in step S502), the storage management unit 35 transmits a file registration command to the duplication determination unit 36, along with the file main body and the information indicating whether the file is an image file that can be handled by the file storage apparatus 30 (step S503, to step S400 for the subsequent process).

After completion of the file registration process, the duplication determination unit 36 notifies the storage management unit 35 of information about a file storage destination address in the storage unit 37, the resolution information, the file format information, and the file size.

After completion of the file registration process by the duplication determination unit 36, if the write target file is an image file that can be handled, the storage management unit 35 creates an entry in the file management table. The entry includes the file ID information, the storage destination address information, the resolution information, the file format information, and the file size (step S504).

If the write target file is not an image file that can be handled, the storage management unit 35 creates an entry including only the file ID information and the storage destination address information in the file management table (step S504).

In addition, the storage management unit 35 notifies the format determination unit 33 of completion of the file write process (step S504).

If an entry matching the file ID information transmitted from the format determination unit 33 exists in the file management table of the storage management unit 35 (corresponding to a file update process) (Yes in step S502), the storage management unit 35 transmits a file deletion command to the duplication determination unit 36, along with the storage destination address information registered in the entry corresponding to the file ID information that has already been registered (step S505). In addition, after completion of the deletion process, the storage management unit 35 transmits the above file registration command to the duplication determination unit 36 (step S506, to step S400 for the subsequent process).

After completion of the file registration process, the storage management unit 35 updates information about the entry that is associated with the registration target file ID information and that is included in the file management table, based on the information transmitted along with the notification of completion of the registration process from the duplication determination unit 36 (step S507). In addition, the storage management unit 35 notifies the format determination unit 33 of completion of the file write process.

When notified of completion of the write process by the storage management unit 35, the format determination unit 33 notifies the file management unit 32 of the file ID information and completion of the write process.

When notified of completion of the write process, the file management unit 32 sets the flag indicating completion of the write process regarding the file ID information to a write completion state. Thus, the write process is completed.

<Procedure of Reading File>

FIG. 8 is a flow chart illustrating a file read process according to the present exemplary embodiment. A file reading procedure by the file storage apparatus 30 will be described with reference to FIG. 8.

The file management unit 32 transmits the file ID information transmitted along with a file read command from the request processing unit 31 to the storage management unit 35, along with a file object read command (step S600).

When receiving the file read command, the storage management unit 35 retrieves an entry having file ID information matching the above file ID information from the entries registered in the file management table, extracts information about a storage destination address in the storage unit 37, and reads a corresponding file main body from the storage unit 37 (step S601).

The storage management unit 35 checks whether resolution information, file format information, and a file size are registered in the above entry (step S602).

If the above information is not registered (No in step S602), the storage management unit 35 transmits the file main body read from the storage unit 37 to the file management unit 32 (step S604). In addition, the storage management unit 35 notifies the file management unit 32 of completion of the read process.

If the above information is registered (Yes in step S602), the storage management unit 35 transmits the file main body read from the storage unit 37, the resolution information, the file format information, and the file size to the format conversion unit 34 (step S603).

In addition, the format conversion unit 34 checks the file main body, the resolution information, the file format information, and the file size transmitted from the storage management unit 35. If any one of the format and the size is different, the format conversion unit 34 converts elements different from the file main body, among the resolution information, the file format information, and the file size. Namely, the format conversion unit 34 converts the resolution, the file format, and the compression rate of the file main body and transmits the converted file main body to the storage management unit 35 (step S603).

In addition, the storage management unit 35 transmits the above file main body to the file management unit 32 (step S604) and notifies the file management unit 32 of completion of the read process.

<Procedure of Deleting File>

The file deletion procedure by the file storage apparatus 30 is the same as that according to the first exemplary embodiment.

While exemplary embodiments have thus been described with reference to the drawings, specific configurations are not limited to the above exemplary embodiments. For example, various design variations are possible without departing from the gist of the present invention.

The above file storage apparatus 30 includes a computer system. An operation of each of the above processing units may be stored in a computer-readable recording medium as a program, and the above processes may be executed by causing a computer to read and execute this program.

Examples of the computer-readable recording medium include a magnetic disk, a magneto-optical disk, a CD-ROM, a DVD-ROM, and a semiconductor memory.

In addition, this computer program may be distributed to a computer via a communication line and the computer that has received this distributed computer program may execute the program.

In addition, the above program may be a program partially realizing the above functions.

In addition, the above functions may be realized by a file in combination with a program that has already been stored in a computer system. Namely, the above functions may be realized by a so-called differential file (differential program).

The disclosures of the above Patent Literatures are incorporated herein by reference thereto. Modifications and adjustments of the exemplary embodiment are possible within the scope of the overall disclosure (including the claims) of the present invention and based on the basic technical concept of the present invention. Various combinations and selections of various disclosed elements (including each element of each claim, each element of each exemplary embodiment, each element of each drawing, etc.) are possible within the scope of the claims of the present invention. That is, the present invention of course includes various variations and modifications that could be made by those skilled in the art according to the overall disclosure including the claims and the technical concept. Particularly, any numerical range disclosed herein should be interpreted that any intermediate values or subranges falling within the disclosed range are also concretely disclosed even without specific recital thereof.

While part or all of the above exemplary embodiments can be described as the following supplementary notes, the present invention is not limited thereto.

(Supplementary Note 1)

A file storage apparatus, comprising:
a duplication determination unit that determines whether or not a file supplied from a client apparatus and a file stored in a storage unit coincide with each other in a same format, and stores the file supplied from the client apparatus in the storage unit if the files do not coincide with each other in the same format; and
a storage management unit that associates, if the duplication determination unit determines that the files coincide with each other in the same format, a format of the file supplied from the client apparatus with the file stored in the storage unit, reads a file stored in the storage unit in response to a file read request from a client apparatus, converts, if a format associated with the read file exists, the read file into the format, and provides the converted file.

(Supplementary Note 2)

The file storage apparatus according to supplementary note 1, wherein if similarity between feature information extracted from the file supplied from the client apparatus and feature information extracted from the file stored in the storage unit is not less than a predetermined threshold, the duplication determination unit determines that the files coincide with each other.

(Supplementary Note 3)

The file storage apparatus according to supplementary note 2, wherein if the file supplied from the client apparatus is an image file, the duplication determination unit extracts color information and/or shape information about an image as the feature information.

(Supplementary Note 4)

The file storage apparatus according to any one of supplementary notes 1 to 3, wherein
the duplication determination unit determines whether or not a file supplied from the client apparatus and a file stored in the storage unit coincide with each other in a same resolution, and stores the file supplied from the client apparatus in the storage unit if the files do not coincide with each other in the same resolution, and
if the duplication determination unit determines that the files coincide with each other in the same resolution, the storage management unit associates a resolution of the file supplied from the client apparatus with the file stored in the storage unit, reads a file stored in the storage unit in response to a file read request from a client apparatus, converts, if a resolution associated with the read file exists, the read file into the resolution, and provides the converted file.

(Supplementary Note 5)

The file storage apparatus according to any one of supplementary notes 1 to 4, wherein
the duplication determination unit determines whether or not a file supplied from the client apparatus and a file stored in the storage unit coincide with each other in a same compression rate, and stores the file supplied from the client apparatus in the storage unit if the files do not coincide with each other in the same compression rate,
the storage management unit associates, if the duplication determination unit determines that the files coincide with each other in the same compression rate, a file size of the file supplied from the client apparatus with the file stored in the storage unit, reads a file stored in the storage unit in response to a file read request from a client apparatus, converts, if a file size associated with the read file exists, the read file into the file size, and provides the converted file.

(Supplementary Note 6)

The file storage apparatus according to any one of supplementary notes 1 to 5, further comprising the storage unit.

(Supplementary Note 7)

The file storage apparatus according to any one of supplementary notes 1 to 6; wherein the file storage apparatus is shared by a plurality of client apparatuses.

(Supplementary Note 8)

A file storage method, comprising:
determining whether or not a file supplied from a client apparatus and a file stored in a storage unit coincide with each other in a same format;
storing the file supplied from the client apparatus in the storage unit if the files do not coincide with each other in the same format;
associating, if it is determined that the files coincide with each other in the same format, a format of the file supplied from the client apparatus with the file stored in the storage unit; and
reading a file stored in the storage unit in response to a file read request from a client apparatus, converting, if a format associated with the read file exists, the read file into the format, and providing the converted file.

(Supplementary Note 9)

The file storage method according to supplementary note 8, wherein the determining comprises, if similarity between feature information extracted from the file supplied from the client apparatus and feature information extracted from the file stored in the storage unit is not less than a predetermined threshold, determining that the files coincide with each other.

(Supplementary Note 10)

The file storage method according to supplementary note 9, wherein the determining comprises, if the file supplied from the client apparatus is an image file, extracting color information and/or shape information about an image as the feature information.

(Supplementary Note 11)

The file storage method according to any one of supplementary notes 8 to 10, wherein
the determining comprises determining whether or not a file supplied from the client apparatus and a file stored in the storage unit coincide with each other in a same resolution,
if it is determined that the files coincide with each other in the same resolution, the associating comprises associating a resolution of the file supplied from the client apparatus with the file stored in the storage unit, and
the reading, the converting and the providing comprise reading a file stored in the storage unit in response to a file read request from a client apparatus, converting, if a resolution associated with the read file exists, the read file into the resolution, and providing the converted file.

(Supplementary Note 12)

The file storage method according to any one of supplementary notes 8 to 11, wherein the determining comprises determining whether or not a file supplied from the client apparatus and a file stored in the storage unit coincide with other in a same compression rate, the associating comprises associating, if it is determined that the files coincide with each other in the same compression rate, a file size of the file supplied from the client apparatus with the file stored in the storage unit, and the reading, the converting and the providing comprise reading a file stored in the storage unit in response to a file read request from a client apparatus, converting, if a file size associated with the read file exists, the read file into the file size, and providing the converted file.

(Supplementary Note 13)

A program, causing a computer to execute:

determining whether or not a file supplied from a client apparatus and a file stored in a storage unit coincide with each other in a same format;

storing the file supplied from the client apparatus in the storage unit if the files do not coincide with each other in the same format;

associating, if it is determined that the files coincide with each other in the same format, a format of the file supplied from the client apparatus with the file stored in the storage unit; and reading a file stored in the storage unit in response to a file read request from a client apparatus, converting, if a format associated with the read file exists, the read file into the format, and providing the converted file.

(Supplementary Note 14)

The program according to supplementary note 13, wherein the determining comprises, if similarity between feature information extracted from the file supplied from the client apparatus and feature information extracted from the file stored in the storage unit is not less than a predetermined threshold, determining that the files coincide with each other.

(Supplementary Note 15)

The program according to supplementary note 14, wherein the determining comprises, if the file supplied from the client apparatus is an image file, extracting color information and/or shape information about an image as the feature information.

(Supplementary Note 16)

The program according to any one of supplementary notes 13 to 15, wherein the determining comprises determining whether or not a file supplied from the client apparatus and a file stored in the storage unit coincide with each other in a same resolution, if it is determined that the files coincide with each other in the same resolution, the associating comprises associating a resolution of the file supplied from the client apparatus with the file stored in the storage unit, and the reading, the converting and the providing comprise reading a file stored in the storage unit in response to a file read request from a client apparatus, converting, if a resolution associated with the read file exists, the read file into the resolution, and providing the converted file.

(Supplementary Note 17)

The program according to any one of supplementary notes 13 to 16, wherein the determining comprises determining whether or not a file supplied from the client apparatus and a file stored in the storage unit coincide with each other in a same compression rate, the associating comprises associating, if it is determined that the files coincide with each other in the same compression rate, a file size of the file supplied from the client apparatus with the file stored in the storage unit, and the reading, the converting and the providing comprise reading a file stored in the storage unit in response to a file read request from a client apparatus, converting, if a file size associated with the read file exists, the read file into the file size, and providing the converted file.

[Reference Signs List]

10 client apparatus
20 network
30 file storage apparatus
31 request processing unit
32 file management unit
33 format determination unit
34 format conversion unit
35 storage management unit
36 duplication determination unit
37 storage unit

The invention claimed is:

1. A file storage apparatus, comprising:

a duplication determination unit that determines whether or not a file supplied from a client apparatus and a file stored in a storage unit coincide with each other in a same format, and stores the file supplied from the client apparatus in the storage unit if the files do not coincide with each other in the same format; and a storage management unit that associates, if the duplication determination unit determines that the files coincide with each other in the same format, a format of the file supplied from the client apparatus with the file stored in the storage unit, reads a file stored in the storage unit in response to a file read request from a client apparatus, converts, if a format associated with the read file exists, the read file into the format, and provides the converted file, wherein, if similarity between feature information extracted from the file supplied from the client apparatus and feature information extracted from the file stored in the storage unit is not less than a predetermined threshold, the duplication determination unit determines that the files coincide with each other, and if the file supplied from the client apparatus is an image file, the duplication determination unit extracts at least one of color information and shape information about an image as the feature information.

2. The file storage apparatus according to claim 1, wherein the duplication determination unit determines whether or not a file supplied from the client apparatus and a file stored in the storage unit coincide with each other in a same resolution, and stores the file supplied from the client apparatus in the storage unit if the files do not coincide with each other in the same resolution, and if the duplication determination unit determines that the files coincide with each other in the same resolution, the storage management unit associates a resolution of the file supplied from the client apparatus with the file stored in the storage unit, reads a file stored in the storage unit in response to a file read request from a client apparatus, converts, if a resolution associated with the read file exists, the read file into the resolution, and provides the converted file.

3. The file storage apparatus according to claim 1, wherein the duplication determination unit determines whether or not a file supplied from the client apparatus and a file stored in the storage unit coincide with each other in a same compression rate, and stores the file supplied from the client apparatus in the storage unit if the files do not coincide with each other in the same compression rate, the storage management unit associates, if the duplication determination unit determines that the files coincide with each other in the same compression rate, a file size of the file supplied from the client apparatus with the file stored in the storage unit, reads a file stored in the storage unit in response to a file read request from a client apparatus, converts, if a file size associated with the read file exists, the read file into the file size, and provides the converted file.

4. The file storage apparatus according to claim 1, further comprising the storage unit.

5. The file storage method according to claim 1, wherein
the determining comprises determining whether or not a file supplied from the client apparatus and a file stored in the storage unit coincide with each other in a same resolution,
if it is determined that the files coincide with each other in the same resolution, the associating comprises associating a resolution of the file supplied from the client apparatus with the file stored in the storage unit, and
the reading, the converting and the providing comprise reading a file stored in the storage unit in response to a file read request from a client apparatus, converting, if a resolution associated with the read file exists, the read file into the resolution, and providing the converted file.

6. The file storage method according to claim 1, wherein
the determining comprises determining whether or not a file supplied from the client apparatus and a file stored in the storage unit coincide with other in a same compression rate,
the associating comprises associating, if it is determined that the files coincide with each other in the same compression rate, a file size of the file supplied from the client apparatus with the file stored in the storage unit, and
the reading, the converting and the providing comprise reading a file stored in the storage unit in response to a file read request from a client apparatus, converting, if a file size associated with the read file exists, the read file into the file size, and providing the converted file.

7. A storage system, comprising:
the file storage apparatus according to claim 1; and
a plurality of client apparatuses sharing the file storage apparatus.

8. A file storage method, comprising:
determining whether or not a file supplied from a client apparatus and a file stored in a storage unit coincide with each other in a same format;
storing the file supplied from the client apparatus in the storage unit if the files do not coincide with each other in the same format;
associating, if it is determined that the files coincide with each other in the same format, a format of the file supplied from the client apparatus with the file stored in the storage unit; and
reading a file stored in the storage unit in response to a file read request from a client apparatus, converting, if a format associated with the read file exists, the read file into the format, and providing the converted file, wherein,
the determining comprises, if similarity between feature information extracted from the file supplied from the client apparatus and feature information extracted from the file stored in the storage unit is not less than a predetermined threshold, determining that the files coincide with each other, and
the determining further comprises, if the file supplied from the client apparatus is an image file, extracting at least one of color information and shape information about an image as the feature information.

9. A non-transitory computer-readable storage medium, storing a program that causes a computer to execute:
determining whether or not a file supplied from a client apparatus and a file stored in a storage unit coincide with each other in a same format;
storing the file supplied from the client apparatus in the storage unit if the files do not coincide with each other in the same format;
associating, if it is determined that the files coincide with each other in the same format, a format of the file supplied from the client apparatus with the file stored in the storage unit; and
reading a file stored in the storage unit in response to a file read request from a client apparatus, converting, if a format associated with the read file exists, the read file into the format, and providing the converted file, wherein,
the determining comprises, if similarity between feature information extracted from the file supplied from the client apparatus and feature information extracted from the file stored in the storage unit is not less than a predetermined threshold, determining that the files coincide with each other, and
the determining further comprises, if the file supplied from the client apparatus is an image file, extracting at least one of color information and shape information about an image as the feature information.

10. The non-transitory computer-readable storage medium according to claim 9, wherein
the determining comprises determining whether or not a file supplied from the client apparatus and a file stored in the storage unit coincide with each other in a same resolution,
if it is determined that the files coincide with each other in the same resolution, the associating comprises associating a resolution of the file supplied from the client apparatus with the file stored in the storage unit, and
the reading, the converting and the providing comprise reading a file stored in the storage unit in response to a file read request from a client apparatus, converting, if a resolution associated with the read file exists, the read file into the resolution, and providing the converted file.

11. The non-transitory computer-readable storage medium according to claim 9, wherein
the determining comprises determining whether or not a file supplied from the client apparatus and a file stored in the storage unit coincide with each other in a same compression rate,
the associating comprises associating, if it is determined that the files coincide with each other in the same compression rate, a file size of the file supplied from the client apparatus with the file stored in the storage unit, and
the reading, the converting and the providing comprise reading a file stored in the storage unit in response to a file read request from a client apparatus, converting, if a file size associated with the read file exists, the read file into the file size, and providing the converted file.

* * * * *